(12) United States Patent
Tsai et al.

(10) Patent No.: US 8,121,400 B2
(45) Date of Patent: Feb. 21, 2012

(54) METHOD OF COMPARING SIMILARITY OF 3D VISUAL OBJECTS

(75) Inventors: Chih-Hsiang Tsai, Changhua County (TW); Hui-Wen Chen, Taipei (TW); Chao-Ming Wang, Taipei (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 373 days.

(21) Appl. No.: 12/565,768

(22) Filed: Sep. 24, 2009

(65) Prior Publication Data

US 2011/0069892 A1 Mar. 24, 2011

(51) Int. Cl.
*G06K 9/00* (2006.01)
(52) U.S. Cl. .................................................. 382/154
(58) Field of Classification Search .................. 382/154, 382/162, 165, 167, 285; 715/757, 852
See application file for complete search history.

(56) References Cited

U.S. PATENT DOCUMENTS

| 2007/0110298 A1* | 5/2007 | Graepel et al. ............. 382/154 |
| 2009/0022393 A1* | 1/2009 | Bar-Zohar et al. .......... 382/154 |
| 2009/0169096 A1* | 7/2009 | Cipolla et al. ............. 382/154 |

* cited by examiner

*Primary Examiner* — Brian Le
(74) *Attorney, Agent, or Firm* — Winston Hsu; Scott Margo

(57) ABSTRACT

Comparison of parameters, including width, length, depth, color, and shape of a target object with a reference object is performed through use of a stereo camera. If the parameters of the target object are within threshold values of the parameters of the reference object, a match is indicated. If not, a new reference object is selected for comparison with the target object.

7 Claims, 5 Drawing Sheets

METHOD OF COMPARING SIMILARITY OF 3D VISUAL OBJECTS

BACKGROUND OF THE INVENTION

1. Field of the Invention

The present invention relates to methods for comparing similarity of visual objects, and more particularly to a method and system for comparing similarity of 3D visual objects that combines 3D visual object measurement, color similarity determination, and shape similarity determination to solve an RST (rotation, scaling, translation) problem in object comparison effectively.

2. Description of the Prior Art

In the field of object similarity detection, typically a target object is compared with a reference object to identify the target object based on similarity of the target object to the reference object. Color and shape similarity may be utilized for determining similarity of the target object to the reference object. 2D images of the target object and the reference object, both of which may be 3D objects, are analyzed to match the target object to the reference object.

Color similarity may be performed through use of RGB histograms. For example, RGB histograms of an image of the target object and an image of the reference object may be compared to match the images. If illumination-independent color descriptors are utilized for comparing the histograms, matching becomes even more effective. However, multiple challenges face this object recognition method, including changes in viewpoint, orientation of the target object relative to the reference object, changes in intensity of illumination, changes in color of the illumination, noise, and occlusion of the target object, to name a few. One method compares YCbCr histograms of the images of the target object and the reference object using Bhattacharyya distance. While color histograms provide a method for recognizing different objects based on their respective color compositions, color similarity alone is unable to overcome the problem of similar color compositions belonging to objects of different shape.

Shape similarity may be determined in a number of ways, including use of shape context. Please refer to FIG. 1, which is a diagram illustrating use of shape context for determining shape similarity of a target object 100 and a reference object 101. Utilizing log-polar histogram bins 150, shape contexts 120, 121, 122 may be calculated corresponding to coordinates 110, 111, 112, respectively. The shape contexts 120, 121, 122 are log-polar histograms using the coordinates 110, 111, 112 as an origin, respectively. As can be seen in FIG. 1, the shape contexts 120, 121 corresponding to the coordinates 110, 111 are very similar to each other, whereas the shape context 122 corresponding to the coordinates 112 is dissimilar with the shape contexts 120, 121. As shown, the log-polar histogram bins 150 are arranged in five concentric circles, each split into twelve segments. Thus, each shape context 120, 121, 122 may be a 12×5 matrix, each cell of which contains information about number of pixels in the corresponding segment. Positions of nearby pixels may be emphasized over pixels farther away from the origin by utilizing a log-polar² space for the log-polar histogram bins 150. In choosing distance from the origin to the outermost circle, namely radius of the outermost circle, a diagonal of a smallest rectangle that can enclose the object (reference or target) may be found. This ensures that each pixel of the object will fall within the log-polar histogram bins 150 regardless of which pixel is chosen as the origin. When forming shape contexts, one shape context may be formed for each pixel by setting the pixel as the origin, and calculating how many of the remaining pixels fall into each bin of the log-polar histogram bins 150. To determine similarity, assuming Si(h) represents an $i^{th}$ shape context of the reference object, Rj (h) represents a $j^{th}$ shape context of the target object, and each shape context includes M rows, similarity of the shape contexts is expressed as:

$$Sim = \arg\min_{i=[0,M-1]} \frac{1}{M} \sum_{j=0}^{M-1} \frac{\min(S_j, R_j)}{\max(S_j, R_j)}. \tag{1}$$

Because sample pixels are utilized for shape comparison, different size and rotation of the target object relative to the reference object may be tolerable. However, said tolerance may make it impossible to distinguish between objects with similar shape but different size. Further, shape similarity alone is unable to overcome the problem of similarly shaped objects of different colors.

Please refer to FIG. 2, which is a diagram illustrating utilizing a stereo camera to obtain object disparity. By utilizing a stereo camera, e.g. a left camera and a right camera, 3D information of the target object may be measured, adding a dimension of depth on top of 2D information originally available to a single camera. FIG. 2 shows a stereo camera system. A point P is a point in space having coordinates (X, Y, Z). Points $p_l$ and $p_r$ having coordinates $(x_l,y_l)$ and $(x_r,y_r)$, respectively, represent intersections of two image planes with two imaginary lines drawn from the point P to optical centers $O_l$ and $O_r$ of the left and right cameras, respectively. Depth information about the point P may be obtained through use of the following formula:

$$Z = D = f\frac{B}{dx}, \tag{2}$$

where D is depth, f is focal length, $dx=x_r-x_l$ is disparity, and $B=O_r-O_l$ is baseline distance. Likewise, coordinates X and Y of the point P may also be found as:

$$X = \frac{x_l Z}{f}, \text{ and} \tag{3}$$

$$Y = \frac{y_l Z}{f}. \tag{4}$$

In this way, the 3D information of the target object may be obtained through the two image planes of the stereo camera.

It can be seen from the above that to obtain the 3D information of a point through the two image planes of the stereo camera, it is necessary to first find positions on the two image planes corresponding to a same point of the target object. FIG. 3 is a diagram illustrating a method of searching for corresponding points in a reference image and a target image. A reference image 301 and a target image 302 are left and right images taken by the stereo camera, each having height H and width W. To find position of a point PT[i] in the target image 302 corresponding to a point PR in the reference image 301, coordinates (x,y) of the point PR are utilized as an origin for search. Starting from the coordinates (x,y), search is performed in the target image 302 along an epipolar line (dashed line in FIG. 3) to find the point PT[i] in the target image 302. The point PT[i] is a point on the epipolar line selected from a range of candidate points PT[0]-PT[N] between the coordinates (x,y) and (x+dmax,y) in the target image 302. The point PT[i] has highest similarity to the point PR out of all the candidate points PT[0]-PT[N], where N corresponds to a maximum search range "dmax". Once the point PT[i] is found, equations (2), (3), and (4) above may be utilized to determine the 3D information of the points PR, PT[i]. As shown in FIG. 3, the point PT[i] may be the point PT[0]. Although the method described for determining the 3D information is able to determine size of the object, the method is unable to detect differences in objects.

Thus, if only color similarity is utilized for similarity detection, incorrect determination of color is likely due to the above-mentioned reasons. Likewise, shape detection is susceptible to incorrect determination of shape due to the reasons mentioned above. And, even a combination of the above two similarity detection methods is unable to recognize objects of different sizes effectively. Further, 3D information determination alone is unable to distinguish between objects.

SUMMARY OF THE INVENTION

According to an embodiment of the present invention, a method of comparing similarity of a 3D reference object and a 3D target object includes providing a stereo camera, calibrating the stereo camera, capturing a right image of the target object on a measurement surface, and capturing a left image of the target object on the measurement surface. A disparity map is generated through 3D information obtained by the stereo camera. The target object is acquired from either the right image or the left image through background difference. The disparity map is utilized to calculate width, length and depth of the target object. Color and shape characteristics of the target object are determined. The 3D reference object is selected for comparison with the target object. If the length of the target object is outside a length threshold of length of the reference object, the width of the target object is outside a width threshold of width of the reference object, the depth of the target object is outside a depth threshold of depth of the reference object, color error between the color characteristics of the target object and color characteristics of the reference object is outside a color error threshold, or shape error between the shape characteristics of the target object and shape characteristics of the reference object is outside a shape error threshold, a new 3D reference object is selected for comparison with the target object. Otherwise, a match is indicated between the target object and the reference object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
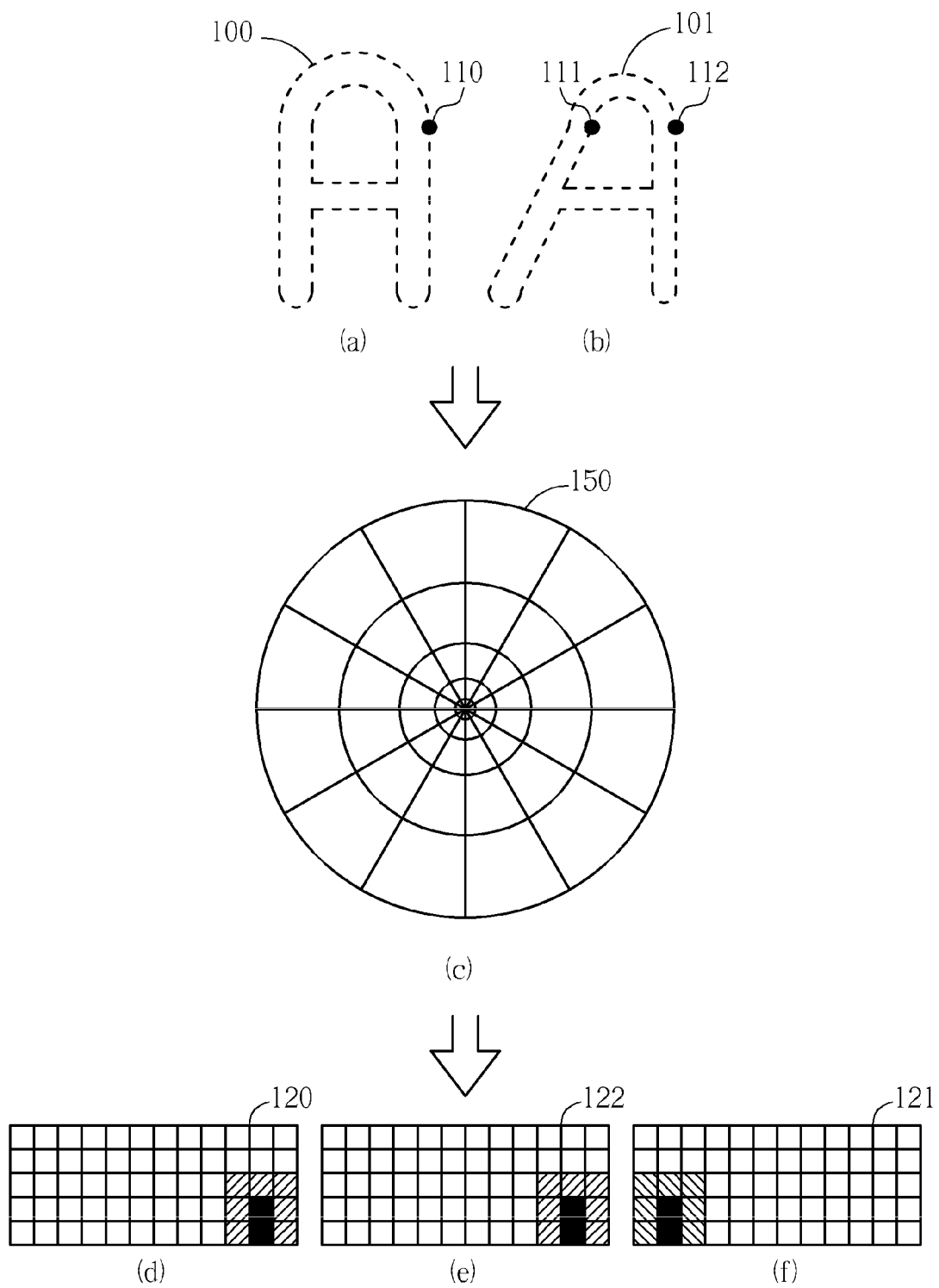
FIG. 1 is a diagram illustrating use of shape context for determining shape similarity of a target object and a reference object.
Figure 2:
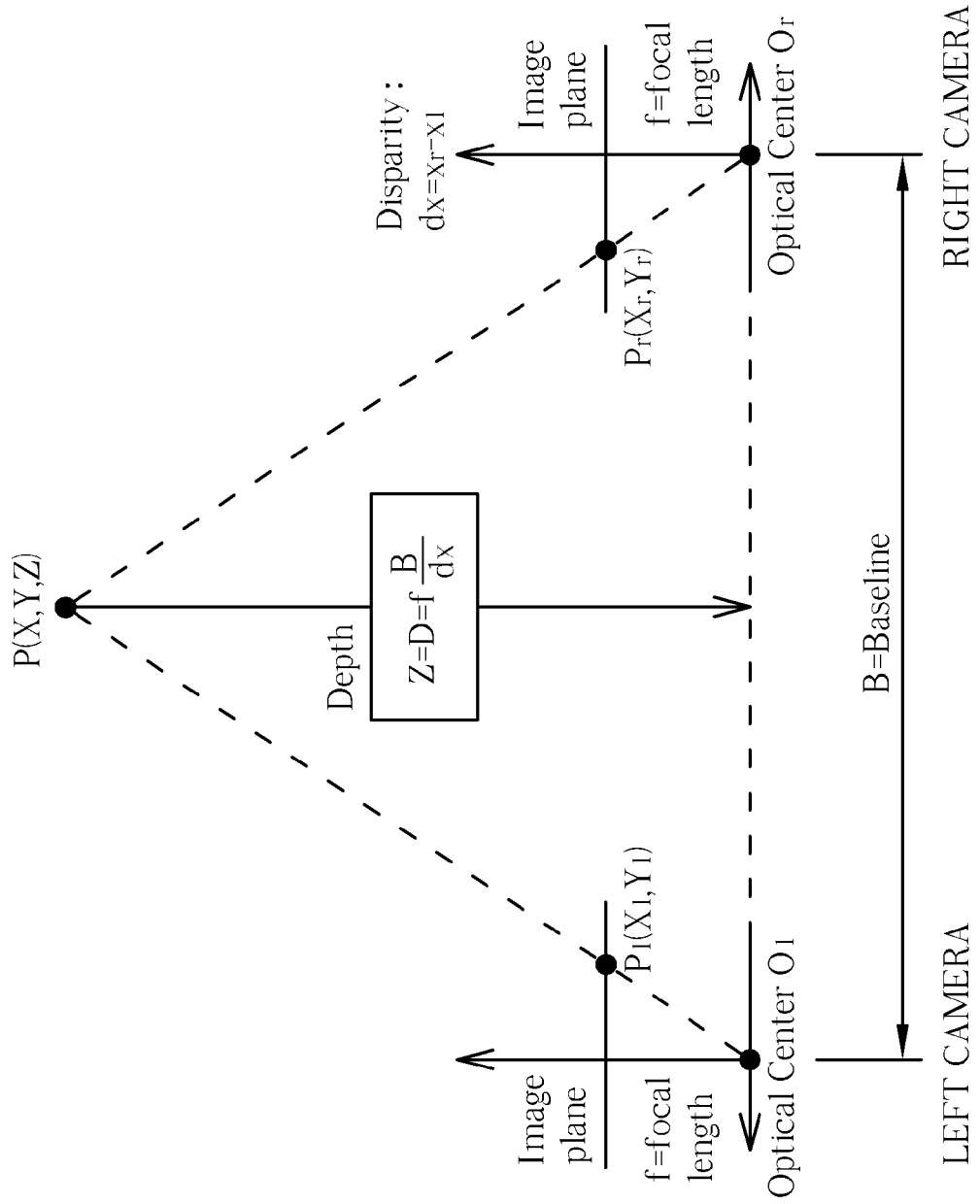
FIG. 2 is a diagram illustrating utilizing a stereo camera to obtain object disparity.
Figure 3:
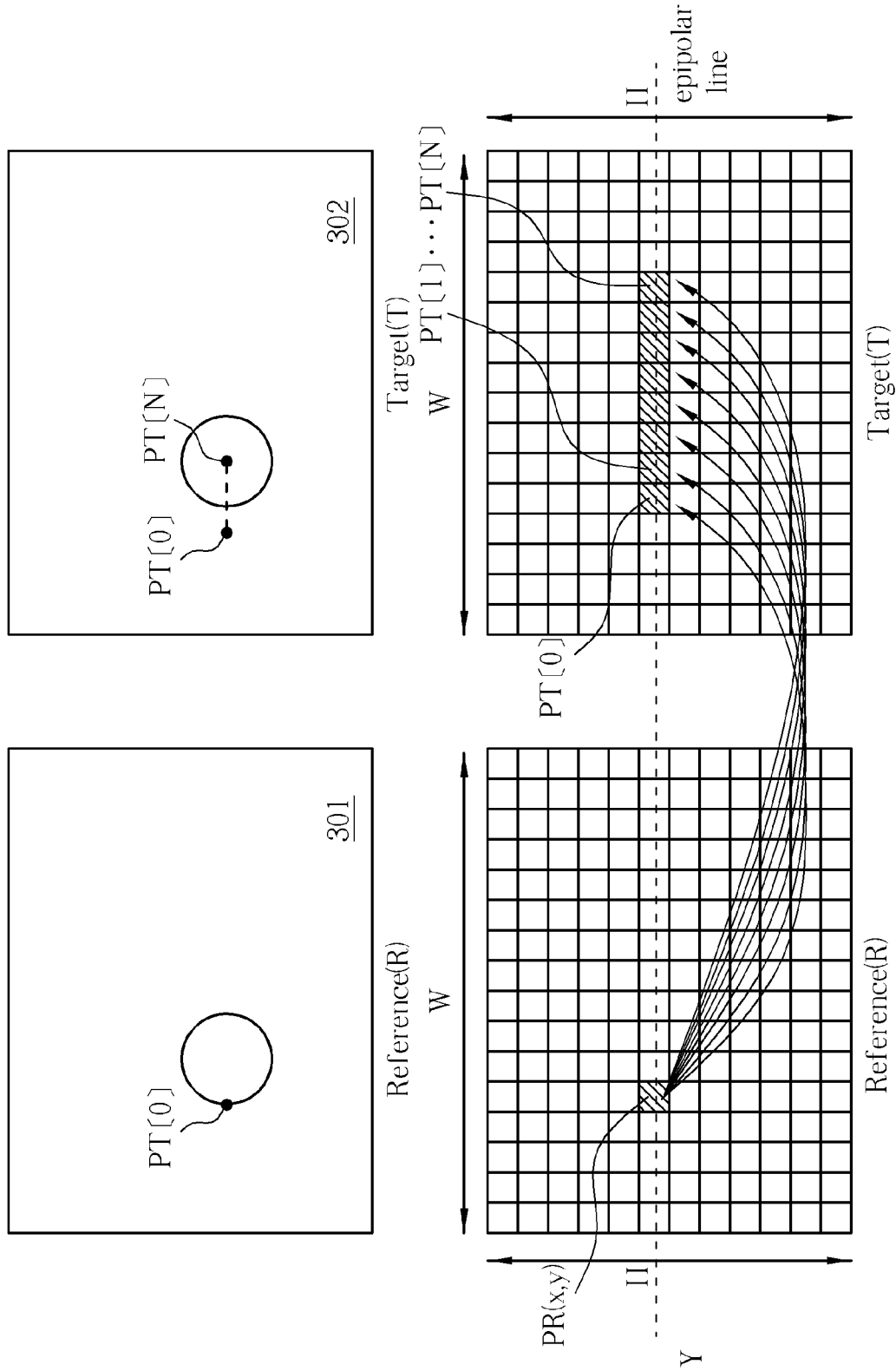
FIG. 3 is a diagram illustrating a method of searching for corresponding points in a reference image and a target image.
Figure 4:
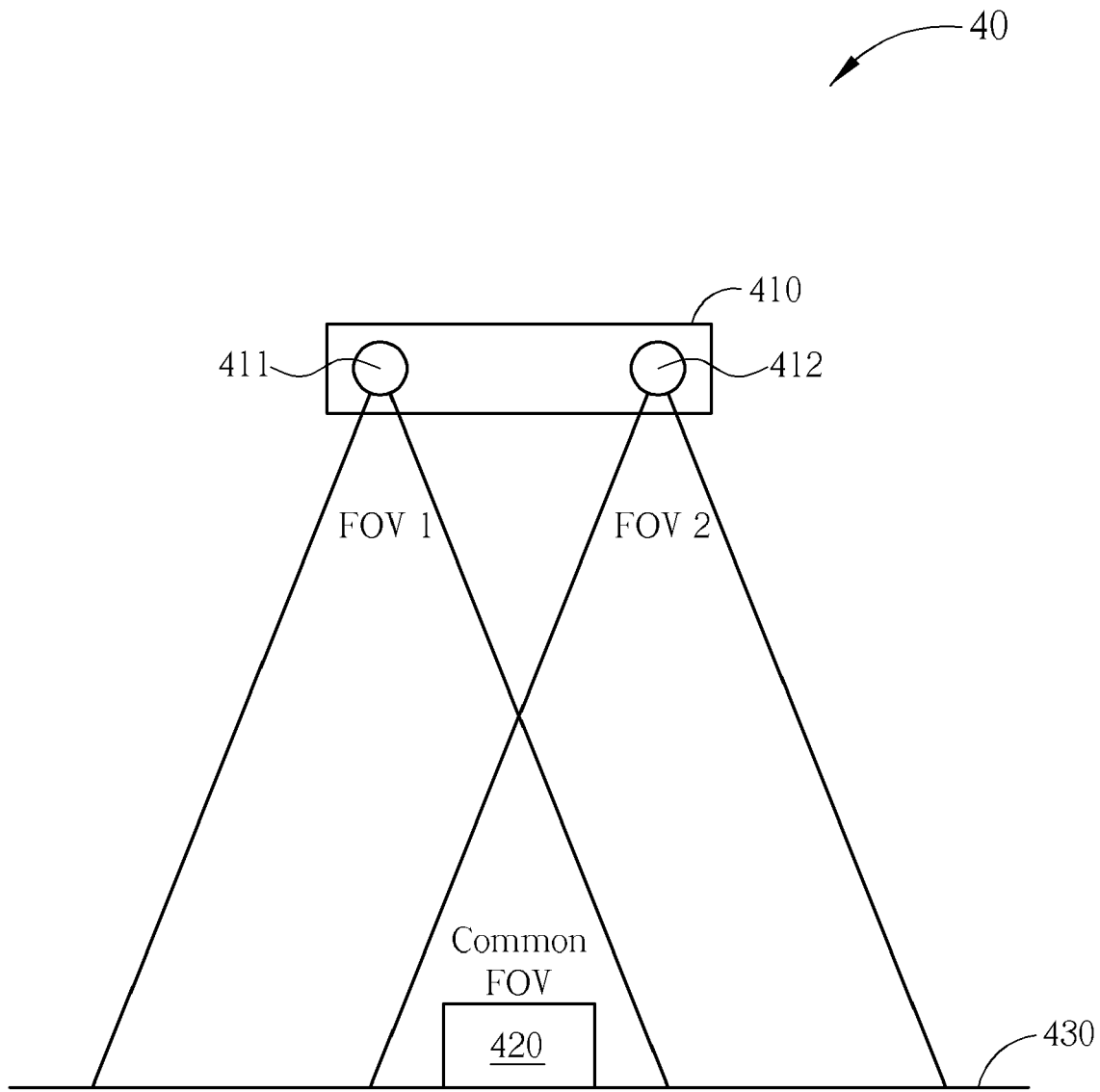
FIG. 4 is a diagram of a measurement system for determining depth of a target object according to an embodiment of the present invention.

Please refer to FIG. 4, which is a diagram of a measurement system 40 for determining depth of a target object 420 according to an embodiment of the present invention. The measurement system 40 includes a stereo camera 410 and a measurement surface 430. The stereo camera 410 may include a left camera 411 and a right camera 412. The left camera 411 and the right camera 412 may have similar or identical specifications, and may be fixed collinearly in the stereo camera 410. The left camera 411 and the right camera 412 may also be calibrated. The left camera 411 may have a first field of view FOV1, and the right camera 412 may have a second field of view FOV2. A common field of view (FOV) may be an intersection of the first field of view FOV1 and the second field of view FOV2. When the target object 420 is positioned on the measuring surface 430 within the common FOV of the stereo camera 410, the stereo camera 410 may determine size of the target object 420 according to disparity of the left camera 411 and the right camera 412, so as to improve accuracy when determining similarity of the target object 420 to a reference object. In order to measure depth of the target object 420, the target object 420 may be positioned on the measurement surface 430, between the measurement surface 430 and the stereo camera 410, within the common FOV, e.g. along a normal line perpendicular to a line between the left camera 411 and the right camera 412. In this way, depth of the target object 420 may be obtained by determining a difference in distance between the stereo camera 410 and the measurement surface 430 and distance between the stereo camera 410 and the target object 420.

Figure 5:
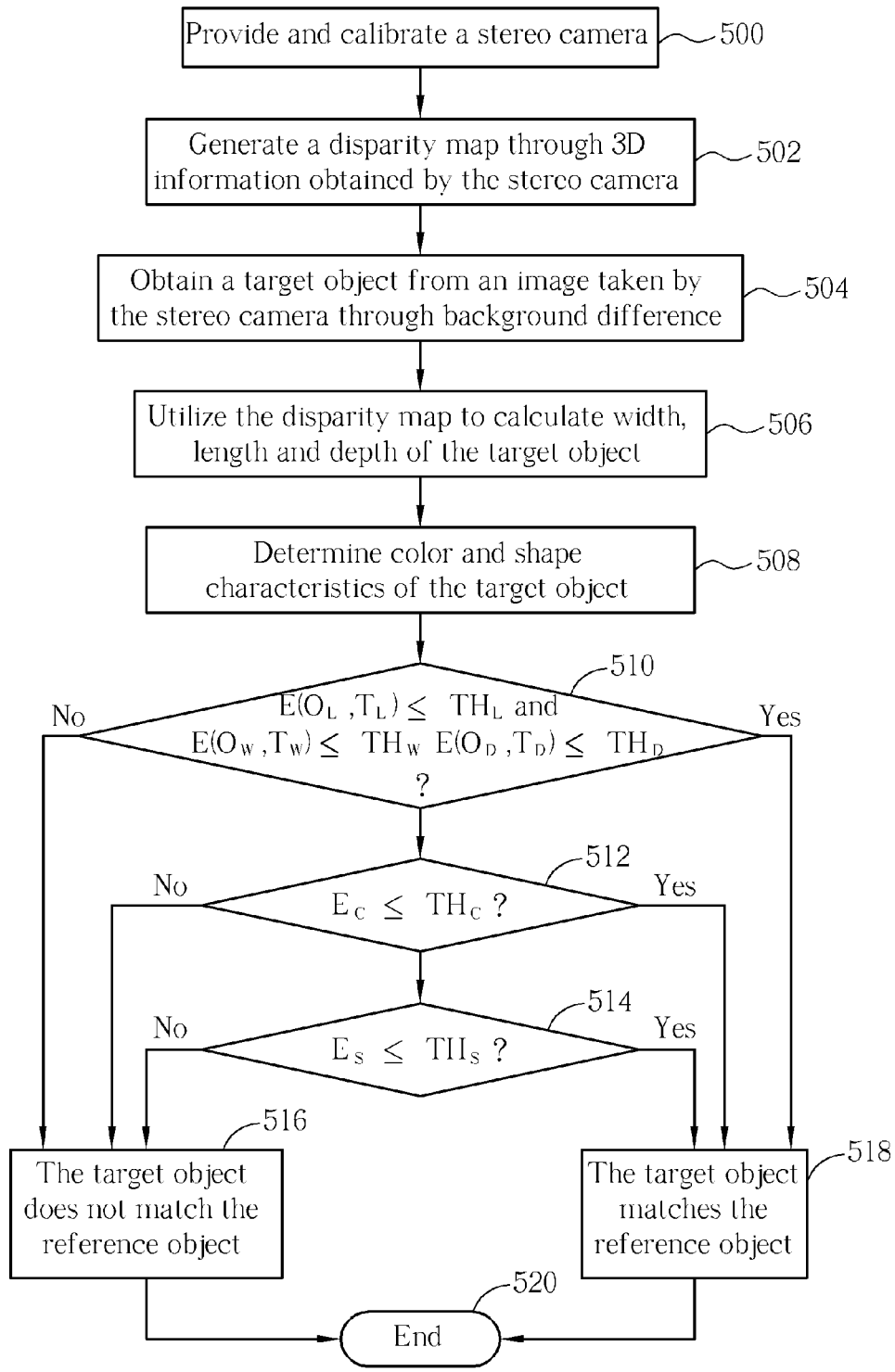
FIG. 5 is a flowchart of a method of performing object recognition according to one embodiment of the present invention.

To overcome the problems mentioned above, a method and system for performing object recognition through 3D information, color, and shape similarity is provided. Please refer to FIG. 5, which is a flowchart of a method of performing object recognition according to one embodiment of the present invention. The method includes advantages of each of the methods described above, and provides better accuracy for object recognition. The method may include at least the following steps:

Step 500: Provide and calibrate a stereo camera;

Step 502: Generate a disparity map through 3D information obtained by the stereo camera;

Step 504: Obtain a target object from an image taken by the stereo camera through background difference;

Step 506: Utilize the disparity map to calculate width, length and depth of the target object;

Step 508: Determine color and shape characteristics of the target object;

Step 510: If length of the target object is within a length threshold of length of a reference object, width of the target object is within a width threshold of width of the reference object, and depth of the target object is within a depth threshold of depth of the reference object, go to Step 512, else go to Step 516;

Step 512: Compare color characteristics of the target object with color characteristics of the reference object to generate a color error; if the color error is within a color error threshold, go to Step 514, else go to Step 516;

Step 514: Compare shape characteristics of the target object with shape characteristics of the reference object to generate a shape error; if the shape error is within a shape error threshold, go to Step 518, else go to Step 520;

Step 516: The target object does not match the reference object, go to Step 520;

Step 518: The target object matches the reference object; and

Step 520: End.

When calibrating the stereo camera (Step 500), baseline B of the stereo camera may be determined according to measurement of distance of the target object to be detected. Left and right cameras having similar characteristics may then be positioned parallel with the baseline B, such that image planes of the left and right cameras may be within an acceptable error threshold of each other, e.g. within 10 pixels in the y direction. Then flexible calibration may be utilized to calculate internal and external parameters of the left and right cameras. A checkerboard pattern may be observed by the stereo camera at a variety of orientations either by moving the stereo camera or by moving the checkerboard pattern. Intersections of lines on the checkerboard pattern in image coordinates and in 3D space coordinates may be utilized to calculated the internal and external parameters, so as to obtain relative coordinates of the left and right cameras, as well as image distortion calibration parameters of the left and right cameras.

A disparity map may be generated through 3D information obtained by the stereo camera (Step 502). According to an image taken by the stereo camera after calibration, a left/right camera check may be performed to compare relative positions of each pixel in a left image and a right image taken by the left camera and the right camera, respectively. Then, relative coordinates may be utilized to generate the disparity map. After the disparity map has been generated, distance to the measurement surface on which the target object is placed may be calculated from the disparity map.

The target object may then be obtained from an image taken by the stereo camera through background difference (Step 504). First, a passive background is established, e.g. a background image may be taken with no target object present. Then, the target object may be extracted from the image through background difference. The target object may be determined from either the right image or the left image through background difference by comparing the right image or the left image with an image of only the measurement surface to determine a portion of the right image or the left image different from the measurement surface that corresponds to the target object. Principal components analysis may then be performed on the target object to determine a primary axis of the target object. The target object may then be normalized according to the primary axis.

The disparity map may then be utilized to calculate width, length, and depth of the target object (Step 506). Distance of the target object from the stereo camera and depth of the target object may be calculated from the disparity map. Then, utilizing triangular proportions, the depth may be utilized to calculate the length and width of the target object. The depth may be calculated as difference between distance to the measurement surface and distance to the target object.

Shape and color characteristics of the target object may be determined (Step 508) through use of color histograms and shape contexts. The color characteristics $(T_{C1}, T_{C2}, \ldots T_{CN})$ may be acquired through the color histograms. The shape characteristics $(T_{S1}, T_{S2}, \ldots T_{SN})$ may be acquired through the shape contexts.

Assuming the reference object has length $O_L$, width $O_W$, and depth $O_D$, and the target object has length $T_L$, width $T_W$, and depth $T_D$, if:

$$E(O_L, T_L) \geq TH_L \text{ and}$$

$$E(O_W, T_W) \geq TH_W \text{ and}$$

$$E(O_D, T_D) \leq TH_D$$

the target object may match the reference object, where $E(O_L, T_L)$, $E(O_W, T_W)$, and $E(O_D, T_D)$ are dimension error functions, and $TH_L$, $TH_W$, and $TH_D$ are length, width, and depth error thresholds, respectively. The length, width, and depth error thresholds may be in units of centimeters (cm), and may be set according to experimental results and/or design requirements. If the length error, width error, or depth error exceeds the length error threshold $TH_L$, the width error threshold $TH_W$, or the depth error threshold $TH_E$, respectively, the target object does not match the reference object, and the process may be terminated.

Assuming color characteristics of the reference object are represented by $(O_{C1}, O_{C2}, \ldots O_{CN})$ and color characteristics of the target object are represented by $(T_{C1}, T_{C2}, \ldots T_{CN})$, if:

$$\min E((O_{C1}, O_{C2}, \ldots O_{CN}), (T_{C1}, T_{C2}, \ldots T_{CN})) \geq TH_C$$

then the target object may match the reference object, where $TH_C$ is a color error threshold that may be set according to experimental results and/or design requirements, and $E((O_{C1}, O_{C2}, \ldots O_{CN}), (T_{C1}, T_{C2}, \ldots T_{CN}))$ is a color error function. If the minimum color error according to $E((O_{C1}, O_{C2}, \ldots O_{CN})/(T_{C1}, T_{C2}, \ldots T_{CN}))$ is greater than the color error threshold $TH_E$, the target object does not match the reference object, and the process may be terminated.

Assuming shape characteristics of the reference object are represented by $(O_{S1}, O_{S2}, \ldots O_{SN})$ and shape characteristics of the target object are represented by $(T_{S1}, T_{S2}, \ldots T_{SN})$, if:

$$\min E((O_{S1}, O_{S2}, \ldots O_{SN}), (T_{S1}, T_{S2}, \ldots T_{SN})) \leq TH_S$$

then the target object may match the reference object, where $TH_S$ is a shape error threshold that may be set according to experimental results and/or design requirements, and $E((O_{S1}, O_{S2}, \ldots O_{SN}), (T_{S1}, T_{S2}, \ldots T_{SN}))$ is a shape error function. If the minimum shape error according to $E((O_{S1}, O_{S2}, \ldots O_{SN})/(T_{S1}, T_{S2}, \ldots T_{SN}))$ is greater than the shape error threshold $TH_S$, the target object does not match the reference object, and the process may be terminated.

In practice, the stereo camera may be positioned at a distance from the measurement surface, and the target object may be placed on the measurement surface. The right camera may take a right image of the target object on the measurement surface, and the left camera may take a left image of the target object on the measurement surface. The width, depth, and length of the target object may then be calculated from the right image and the left image. If the length of the target object is outside the length threshold of the length of the reference object, the width of the target object is outside the width threshold of the width of the reference object, or the depth of the target object is outside the depth threshold of the depth of the reference object, a new 3D reference object may be selected for comparison with the target object. After comparing the target object with all 3D reference objects, a 3D reference object having length, width, and depth characteristics most similar to the target object may be determined. Likewise, if the color error between the color characteristics of the target object and the color characteristics of the reference object is outside the color error threshold, or the shape error between the shape characteristics of the target object and the shape characteristics of the reference object is outside the shape error threshold, the new 3D reference object may be selected for comparison with the target object. After comparing the target object with all 3D reference objects, a 3D reference object having color characteristics most similar to the target object may be determined. Otherwise, a match may be indicated between the target object and the reference object. Thus, Steps 510-516 may be iterated until a match is found between the target object and a matching reference object.

From the above, it may be seen that the method described may overcome the problems encountered when utilizing only color comparison, shape comparison, or a combination of color and shape comparison. Namely, the method described is robust to handle conditions in which the target object and the reference object have different shape and/or different size. Thus, the method described, which utilizes size, color, and shape to match the target object to the reference object, increases accuracy when comparing the target object and the reference object.

Those skilled in the art will readily observe that numerous modifications and alterations of the device and method may be made while retaining the teachings of the invention.

What is claimed is:

1. A method of comparing similarity of a 3D reference object and a 3D target object, the method comprising:
   providing a stereo camera;
   calibrating the stereo camera;
   a right camera of the stereo camera capturing a right image of the target object on a measurement surface;
   a left camera of the stereo camera capturing a left image of the target object on the measurement surface;
   generating a disparity map through 3D information obtained by the stereo camera;
   acquiring the target object from either the right image or the left image through background difference;
   utilizing the disparity map to calculate width, length and depth of the target object according to the right image and the left image;
   determining color characteristics of the target object;
   determining shape characteristics of the target object;
   selecting the 3D reference object for comparison with the target object;
   selecting a new 3D reference object for comparison with the target object if the length of the target object is outside a length threshold of length of the reference object;
   selecting the new 3D reference object for comparison with the target object if the width of the target object is outside a width threshold of width of the reference object;
   selecting the new 3D reference object for comparison with the target object if the depth of the target object is outside a depth threshold of depth of the reference object;
   selecting the new 3D reference object for comparison with the target object if color error between the color characteristics of the target object and color characteristics of the reference object is outside a color error threshold;
   selecting the new 3D reference object for comparison with the target object if shape error between the shape characteristics of the target object and shape characteristics of the reference object is outside a shape error threshold; and
   indicating a match between the target object and the reference object when the length of the target object is within the length threshold of the length of the reference object, the width of the target object is within the width threshold of the width of the reference object, the depth of the target object is within the depth threshold of the depth of the reference object, the color error between the color characteristics of the target object and the color characteristics of the reference object is within the color error threshold, and the shape error between the shape characteristics of the target object and the shape characteristics of the reference object is within the shape error threshold.

2. The method of claim 1, wherein acquiring the target object from either the right image or the left image through background difference is comparing the right image or the left image with an image of only the measurement surface to determine a portion of the right image or the left image different from the measurement surface that corresponds to the target object.

3. The method of claim 1, wherein utilizing the disparity map to calculate the width, the length and the depth of the target object according to the right image and the left image is performed before determining the color characteristics of the target object.

4. The method of claim 3, wherein determining the color characteristics of the target object is performed before determining the shape characteristics of the target object.

5. The method of claim 1, wherein utilizing the disparity map to calculate the width, the length and the depth of the target object according to the right image and the left image is performed before determining the shape characteristics of the target object.

6. The method of claim 5, wherein determining the shape characteristics of the target object is performed before determining the color characteristics of the target object.

7. The method of claim 1, wherein utilizing the disparity map to calculate the depth of the target object according to the right image and the left image is utilizing the disparity map to determine distance between the stereo camera and the target object, and subtracting the distance from distance between the stereo camera and the measurement surface.

* * * * *